(12) United States Patent
Olsen

(10) Patent No.: US 8,925,580 B2
(45) Date of Patent: Jan. 6, 2015

(54) VALVE ARRANGEMENT OF A BLIND FLANGE VALVE

(76) Inventor: Erling Olsen, Oslo (NO)

( * ) Notice: Subject to any disclaimer, the term of this patent is extended or adjusted under 35 U.S.C. 154(b) by 123 days.

(21) Appl. No.: 13/699,833

(22) PCT Filed: Dec. 1, 2010

(86) PCT No.: PCT/NO2010/000439
§ 371 (c)(1),
(2), (4) Date: Nov. 27, 2012

(87) PCT Pub. No.: WO2011/149358
PCT Pub. Date: Dec. 1, 2011

(65) Prior Publication Data
US 2013/0068983 A1      Mar. 21, 2013

(30) Foreign Application Priority Data

May 27, 2010   (NO) .................................... 20100772

(51) Int. Cl.
*F16K 3/00* (2006.01)
*F16K 37/00* (2006.01)
*F16K 3/02* (2006.01)
*F16K 3/312* (2006.01)

(52) U.S. Cl.
CPC ................. *F16K 3/029* (2013.01); *F16K 3/312* (2013.01); *F16K 37/0041* (2013.01)
USPC ............................ 137/554; 137/312; 251/329

(58) Field of Classification Search
USPC ........................... 137/312, 554; 251/327, 329
See application file for complete search history.

(56) References Cited

U.S. PATENT DOCUMENTS

| | | | |
|---|---|---|---|
| 2,151,596 A * | 3/1939 | Halle | 251/202 |
| 3,367,625 A * | 2/1968 | Fortune | 251/172 |
| 3,473,554 A * | 10/1969 | King | 137/312 |
| 4,314,579 A * | 2/1982 | Wheatley et al. | 137/312 |
| 4,749,002 A * | 6/1988 | Lembser | 137/246.22 |
| 5,732,731 A * | 3/1998 | Wafer | 137/312 |
| 5,810,040 A * | 9/1998 | Ludwig | 137/312 |
| 5,908,046 A * | 6/1999 | Mosman | 137/312 |
| 7,107,822 B2 * | 9/2006 | Zachary et al. | 137/312 |

FOREIGN PATENT DOCUMENTS

GB    838850    6/1960
GB    972793    10/1964

\* cited by examiner

*Primary Examiner* — Kevin Lee
(74) *Attorney, Agent, or Firm* — Birch, Stewart, Kolasch & Birch, LLP

(57) ABSTRACT

A valve arrangement to ensure zero leakage from a blind flange valve is described. The blind flange valve is adapted to seal a pipeline into complete sealing according to set requirements. The base, or bottom, of the blind flange valve is in fluid communication with the inlet of an actuateable first valve that is in fluid communication with the inlet of a second actuateable valve. A fluid chamber is in fluid communication with the outlet from the first valve and the inlet of the second valve. The outlet from the second valve can be drained out, and that respective actuateable valves can be actuated by signal from predetermined sensor or sensors.

7 Claims, 1 Drawing Sheet

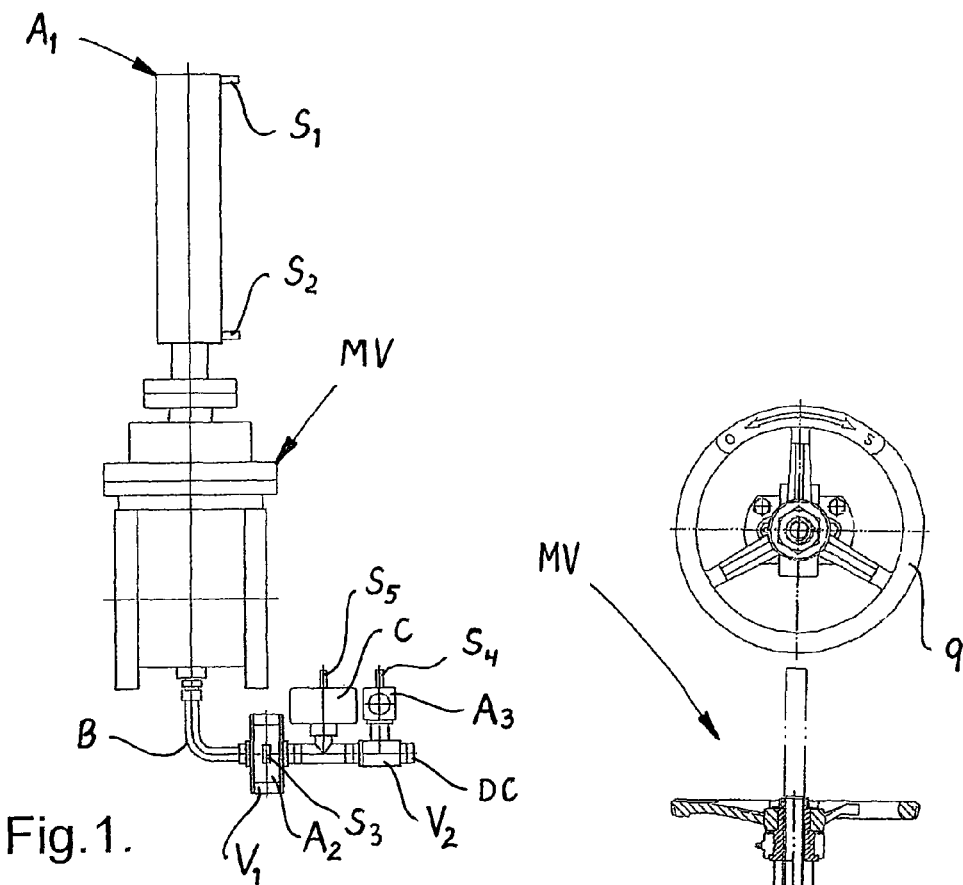
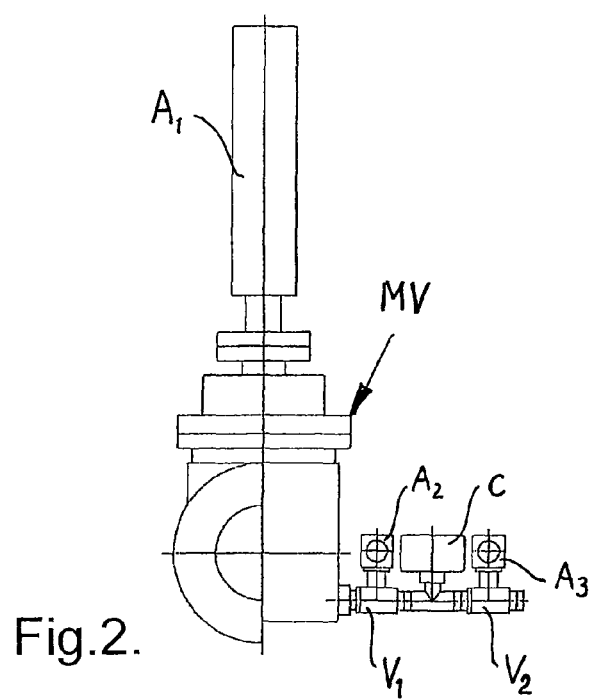
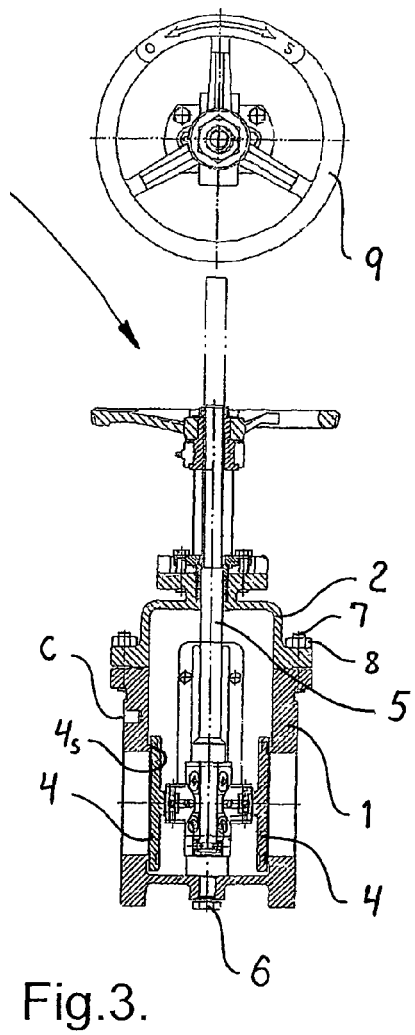

VALVE ARRANGEMENT OF A BLIND FLANGE VALVE

BACKGROUND OF THE INVENTION

1. Field of the Invention

The invention is related to the technical field of blind flange valves. Blind flange valves are typically used on pipelines in order to be able to shut down a fluid flow through the pipeline. Typical fields of use are on board chemical vessels, product tankers, supply ships and drilling rigs. They can also be used on onshore facilities, in particular within the process industries such as refineries, terminals and chemical plants. Often they will be designed into the piping and are installed during construction of the plant/vessel. But retrofit is definitely also possible. The valves are designed for liquids, petroleum products, solvents, chemicals, gases, vapour and water. When fluid flow is in progress the valve element of a blind flange valve is not present within the valve housing, i.e. that the valve element is displaced out of the flow path and parked into a chamber.

2. Description of Background Art

Normally blind flange valves are used on places and in situations where the valve is to remain in open or closed position over an extended period of time between each time the valve is operated. Other kinds of valves, for example a butterfly valve, will possibly get stuck due to deposits and corrosion (rust) after stand still in the same position for a long time. In this respect, a blind flange valve is far more reliable since direct access to the valve element is present, even though it is more elaborate to operate. When a blind flange valve is to be operated, the fluid flow through the blind flange valve first of all needs to be shut off. This is effected in that an externally operated valve is closed, for example a butterfly valve. After that the housing of the blind flange valve can be opened and the valve element installed or removed. The butterfly valve can then be opened again.

SUMMARY OF THE INVENTION

In particular, the present invention relates to a valve arrangement to ensure zero leakage from a blind flange valve, where the blind flange valve includes two discs that are adapted to seal in an upstream direction, respectively downstream direction, into complete sealing according to requirements, at the same time as the discs can be pulled out and into a closed chamber for full flow through the blind flange valve.

Severe safety measures are put on such valves. One requirement is that they shall be absolutely reliable and safe against leakage when in use, i.e. keeps a pipeline closed. If leakage still should occur, such leakage needs to be detectable and be possible to handle and deal with. This means that operation of the blind flange valve and operation of the valve arrangement is to be fully automated.

This is achieved by a valve arrangement of the introductory said kind, which is distinguished in that the base, or bottom, of the blind flange valve is in fluid communication with the inlet of an actuateable first valve, that the outlet of the actuateable first valve is in fluid communication with the inlet of a second actuateable valve, that a fluid chamber is in fluid communication with the outlet from the first valve and the inlet of the second valve, that the outlet from the second valve can be drained out, and that respective actuateable valves are actuated by signal from predetermined sensor or sensors.

Classification companies, or societies, set strict requirements to that the first valve is allowed to be opened immediately after that a blind flange valve has closed. It is said that a person that manually operates a blind flange valve can forget to open the first valve. With that in mind, one may risk leakage through the downstream opening of the blind flange valve and zero leakage is thus not obtained.

Preferably the first valve is connected to an actuator which is able to operate the first valve.

Preferably, the second valve is connected to a second actuator which is able to operate the second valve.

In a useful embodiment, the blind flange valve can be activated by a third actuator which has respective sensors that are able to register the end positions, or limits, of the actuator, which in turn correspond to open/closed blind flange valve.

Other and further objects, features and advantages will appear from the following description of preferred embodiments of the invention, which are given for the purpose of description, and given in context with the appended drawings where:

BRIEF DESCRIPTION OF THE DRAWINGS

FIG. 1 shows schematically a blind flange valve and an associated valve/actuator arrangement according to the invention, FIG. 2 shows schematically a variant of the blind flange valve according to FIG. 1, FIG. 3 shows a longitudinal cross section through a typical blind flange valve which is used together with the valve/actuator arrangement according to the invention.

DETAILED DESCRIPTION OF THE PREFERRED EMBODIMENTS

Reference is firstly made to FIG. 1 that schematically shows a blind flange valve MV designed for installation into a pipeline in order to allow for long term shut off of a fluid flow through a pipeline. The blind flange valve MV itself can be of any per se known kind of brand suited for the purpose. However, the valve still has to be of the kind having sealing discs that are axially displaced against sealing surfaces around upstream and downstream openings, respectively. Such design is basically intended to provide optimal sealing and contribute to ensure zero leakage over long period of times.

By this type of blind flange valves MV, the entire mechanism including the valve discs 4, are displaceable out of the valve housing 2 in order to obtain free flow through the blind flange valve MV, as will be described in further detail with reference to FIG. 3. When the need to shut off the fluid flow through the valve MV arises, the flow must firstly be shut off at another place upstream of the valve MV.

Again with reference to FIG. 1, an actuator $A_1$ is fixedly mounted on top of the blind flange valve MV. The actuator $A_1$ is able to operate the sealing elements of the blind flange valve MV between open and close positions. Further, the actuator $A_1$ is equipped with two sensors, one upper sensor $S_1$ and one lower sensor $S_2$, which are arranged to record the end positions, or limits, of the actuator $A_1$, i.e. register open/closed valve MV.

The blind flange valve MV has a housing with an opening in the bottom thereof. A 90 degrees bend B extends from the opening to a first valve $V_1$. The valve $V_1$ can be operated by means of an actuator $A_2$ between open and closed position. Further, the valve/actuator includes a sensor $S_3$ which is able to indicate if the valve $V_1$ is open or closed.

The outlet from the valve $V_1$ is in communication with a second valve $V_2$ via a connection. The second valve $V_2$ can in a similar way be operated by means of an actuator $A_3$ between open and closed position. Also this valve $V_2$ and actuator $A_3$ includes a sensor $S_4$ which is able to indicate if the valve $V_2$ is open or closed.

A container C is in communication with the connection between the valves $V_1$ and $V_2$. This container C is able to collect and register possible volumes of liquid that might have leaked through the upstream side, i.e. high pressure side, of the blind flange valve MV. Further, the container C includes a sensor $S_4$ that registers full container C. The valves $V_1$ and $V_2$, together with the container C, are generally supplied as a pre-assembled unit.

FIG. 2 shows schematically a variant of the blind flange valve according to FIG. 1, though the same components are included. This variant is only somewhat differently organized. The outlet opening from the housing of the blind flange valve MV is in the side wall of the housing.

A description of the valve arrangement and the mode of operation are now described in connection with FIGS. 1 and 2. As a normal operating position, the blind flange valve MV will be in open full flow position. In this situation, the first valve $V_1$, a draining valve, and the second valve $V_2$, a leakage valve, are both closed. It is again to be noted that when the need to shut off the flow through the valve arises, the flow must firstly be shut off at another place upstream of the valve MV.

Subsequent to such upstream shut off, and on command from a control panel, the blind flange valve MV becomes closed by operating the actuator $A_1$ in normal and well known manner. The sensor $S_2$ provides signal to the control panel when the blind flange valve MV becomes closed. A signal is immediately and automatically communicated to the actuators $A_2$ and $A_3$ that they shall open the valves $V_1$ and $V_2$. Liquid in the valve housing subsequent the closing of the blind flange valve MV, is drained through the valves $V_1$ and $V_2$. After approximately fifteen seconds, the actuator $A_3$ receives a message to close the second valve $V_2$.

Possible leakage through upstream liquid pressure will collect in the container C. The capacity of the container is adapted to the size or dimension of the blind flange valve MV.

If a leakage fills the volumetric capacity of the container C, the sensor $S_5$ provides a signal to the control panel. Such a signal is a message that a sealing ring at the upstream side is hurt and needs to be replaced. In order to determine if replacement needs to take place immediately, or if the replacement can wait until a loading/unloading operation is completed, a signal is communicated to the actuator $A_3$ to open the second valve $V_2$ to drain the container C.

After about fifteen more seconds, a signal is communicated to the actuator $A_3$ to close the second valve $V_2$ and initiate a local time clock in order to register how long time it takes to refill the container C. The operator of the loading/unloading then takes his position if to replace the sealing ring or not. When the loading/unloading operation is finished, the actuator $A_3$ opens the second valve $V_2$ and the entire valve arrangement is drained out. Signals from the operator close the second valve $V_2$ and the first valve $V_1$. By closed first valve $V_1$, a signal is immediately transmitted to the actuator $A_1$ to open the blind flange valve MV. When the valve arrangement is not in use, a dust cover DC is installed on the outlet of the second valve $V_2$.

It is to be emphasized that the valve arrangement according to the invention can be supplied to meet all known International standards and all known requirements from International Classification Societies. I.e. those dimensions, pressure ratings and materials which are required.

FIG. 3 shows a typical and well known blind flange valve MV including the details thereof. However, the shown embodiment is provided with a hand wheel 9, while the embodiment shown in FIGS. 1 and 2 has an actuator A1 to operate the valve. A general description of the blind flange valve MV and its construction will now follow. The blind flange valve MV includes a valve body or housing 1, a valve stem 5 received in said valve housing 1, two valve elements 4 in the form of discs and a cover 2 that provides access to the internals of the valve. The valve housing 1 is provided with a bolt circle C (one bolt opening is shown only) that correspond to the bolt circle of standard flanges of a pipeline (not shown) that the blind flange valve MV typically is mounted between. The valve housing 1 also has a bottom plug 6 for connection of the pipe bend B.

The cover 2 provides guiding of the valve stem 5 and the wheel 9. Preferably a sealing means, a gland, a sealing substance or similar is located between the cover 2 and the valve housing 1. The cover 2 can be tightened by means of respective nuts 8 mounted on pin bolts 7.

The valve elements 4 can be brought to seal against respective valve seats $4_S$ arranged within the valve housing 1. The valves can be brought to motion towards and away from the valve seats $4_S$ by turning the valve stem 5 by the hand wheel 9, alternatively an actuator $A_1$.

By this kind of blind flange valve MV, the entire unit including the valve discs 4, can be displaced out of the valve housing 2 in order to obtain free flow through the valve. As previously stated, when the need to shut off the flow through the valve arises, the flow must firstly be shut off at another place upstream of the valve MV.

The invention claimed is:

1. A valve arrangement for a blind flange valve, the blind flange valve including two discs that are adapted to seal in an upstream direction and a downstream direction, respectively, and the two discs can be pulled into a closed chamber for full flow through the blind flange valve, said valve arrangement comprising:
    an actuatable first valve, a base of a blind flange valve being in fluid communication with an inlet of the actuateable first valve;
    an actuatable second valve, an outlet of the actuateable first valve being in fluid communication with an inlet of the actuatable second valve; and
    a fluid chamber in fluid communication with the outlet of the actuatable first valve and the inlet of the actuatable second valve,
    wherein the outlet of the actuatable second valve can be drained out, and the actuateable first and second valves can be actuated by a signal or signals from at least one sensor.

2. The valve arrangement according to claim 1, wherein the actuatable first valve is connected to an actuator which is able to operate the actuatable first valve.

3. The valve arrangement according to claim 1, wherein the actuatable second valve is connected to an actuator, which is able to operate the actuatable second valve.

4. The valve arrangement according to claim 1, wherein the blind flange valve is actuated by an actuator, said actuator having respective sensors which are able to register limits of the actuator, corresponding to open/closed positions of the blind flange valve.

5. The valve arrangement according to claim 2, wherein the actuator is a first actuator, the actuatable second valve being connected to a second actuator, which is able to operate the actuatable second valve.

6. The valve arrangement according to claim 2, wherein the actuator is a first actuator, the blind flange valve being actuated by a second actuator, said second actuator having respective sensors which are able to register limits of the actuator, corresponding to open/closed positions of the blind flange valve.

7. The valve arrangement according to claim 3, wherein the actuator is a first actuator, the blind flange valve being actuated by a second actuator, said second actuator having respective sensors which are able to register limits of the actuator, corresponding to open/closed positions of the blind flange valve.

\* \* \* \* \*